United States Patent [19]
Vezzani

[11] Patent Number: 5,906,793
[45] Date of Patent: *May 25, 1999

[54] PROCESS FOR THE DISPOSAL OF WET REFUSE

[75] Inventor: Corrado Vezzani, Milan, Italy

[73] Assignee: Vomm Chemiphara S.r.l, Italy

[ * ] Notice: This patent is subject to a terminal disclaimer.

[21] Appl. No.: 08/820,575

[22] Filed: Mar. 19, 1997

[30] Foreign Application Priority Data

Mar. 22, 1996 [IT] Italy ................................. MI96A0579

[51] Int. Cl.$^6$ ...................................................... A61L 2/08
[52] U.S. Cl. ........................ 422/1; 241/DIG. 38; 422/26; 422/307; 422/309
[58] Field of Search ................................ 422/1, 26, 307, 422/308, 309; 241/DIG. 38

[56] References Cited

U.S. PATENT DOCUMENTS

| | | | |
|---|---|---|---|
| 4,296,072 | 10/1981 | Takacs et al. | 422/254 |
| 5,119,994 | 6/1992 | Placzek | 241/17 |
| 5,213,774 | 5/1993 | Noetzel | 422/292 |
| 5,364,589 | 11/1994 | Buehler et al. | 422/26 |
| 5,397,535 | 3/1995 | Kaneko | 422/22 |
| 5,422,074 | 6/1995 | Schmidt | 422/28 |
| 5,635,122 | 6/1997 | Vezzani | 264/115 |

FOREIGN PATENT DOCUMENTS

| | | |
|---|---|---|
| 538653 | 4/1993 | European Pat. Off. . |
| 707858 | 4/1996 | European Pat. Off. . |
| 1430626 | 4/1965 | France . |
| 2061574 | 7/1972 | Germany . |
| 4115781 | 11/1992 | Germany . |
| 408193 | 6/1932 | United Kingdom . |

OTHER PUBLICATIONS

*Patent Abstracts of Japan*, vol. 018, No. 030, Jan. 17, 1994, & JP 05 261201 A, Oct. 12, 1993.

*Primary Examiner*—Krisanne Thornton
*Attorney, Agent, or Firm*—Ostrolenk, Faber, Gerb & Soffen, LL

[57] ABSTRACT

A process for treating so-called wet refuse of urban origin, especially food waste from canteens, communities and other similar catering establishments, and originating from the food industry and the agrifoods industry, including the phases of subjecting a continuous stream of said wet refuse, previously ground, to heating to a pasteurization/sterilization temperature for the time needed for complete cooking, to give a continuous pasty and wet stream of cooked and sanitized refuse and subjecting the said continuous stream to drying, to give a product having a moisture content of not more than 15%.

12 Claims, 1 Drawing Sheet

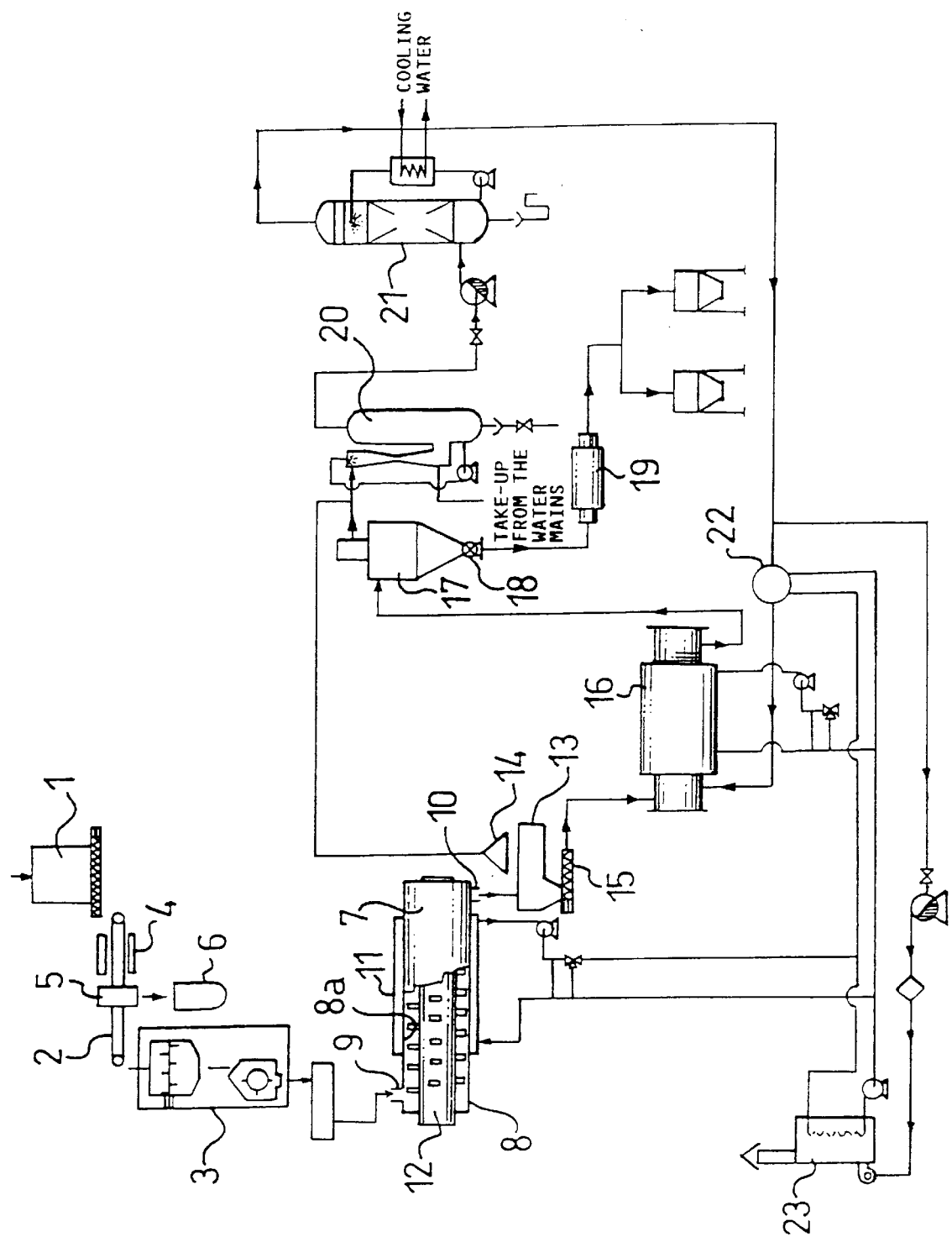

PROCESS FOR THE DISPOSAL OF WET REFUSE

TECHNICAL FIELD

The present invention relates, in its most general aspect, to the disposal of urban as well as industrial refuse.

More particularly, this invention concerns a process for the industrial processing, on a large scale and with great capacity, of so-called wet refuse either of urban origin such as, for example and especially, food waste from catering establishments, canteens, communities and the like, or those originating from the food industry and the agrifoods industry.

BACKGROUND OF THE INVENTION

The most widely used refuse disposal methods comprise those which have the object of transforming the refuse into fertilizer and are essentially based on so-called composting or refuse compost, a kind of anaerobic fermentation.

Such composting can be effected in a "natural" or industrial manner. The first case involves storage of the discharged refuse with the formation of solid heaps which are covered with mould and in which, after a certain fermentation time, the organic parts are transformed into humus containing quantities of nitrogen, phosphorus and potassium which, although they are very low, allow this to be used as organic fertilizer.

The sites destined for the discharges are always large, must be appropriately equipped and prearranged for preventing, for example, pollution of subterranean water tables, require the employment of personnel and means of non-negligible importance and also always involve air pollution problems.

Moreover, completion of the anaerobic fermentation phase always requires not less than 5–6 months.

In the second case, the industrial method involves subjecting the refuse to a preliminary sifting to remove metal parts and to separate out paper, rags, plastics, glass and the like. The remainder is, after appropriate crushing, caused to ferment as in the case of natural fermentation with the respective disadvantages, or the fermentation is primed with suitable cultures in fermentation cells, rotary drums and the like. The time taken for completion of the fermentation is in this case never less than 15–20 days.

Other refuse disposal techniques involve their combustion and are notoriously uneconomical to carry out, and require complicated plant and equipment, which are expensive both in terms of operation and in terms of control; or they involve destruction by chemical attack, which has not met with any success in practice because of the high costs and the recognized technical disadvantages.

Dry distillation to produce coal gas, tar and coke has also been attempted. This technique was promptly abandoned, because it is entirely uneconomical and highly polluting.

SUMMARY OF THE INVENTION

The problem which underlies the present invention is consequently that of providing a process which allows for disposal of wet refuse, in particular wet food refuse of the type defined above, to be effected on an industrial scale, while overcoming all the disadvantages at present recognized in the known techniques, that is to say a process which allows large quantities of wet refuse to be processed continuously and in a highly economical manner and which does not also involve problems of environmental pollution and which can be carried out with equipment and plant which require less space and are easy to operate and control.

This problem is solved according to the invention by a process for treating so-called wet refuse of urban origin, especially food waste from catering establishments, canteens, communities and the like, or originating from the food industry and the agrifoods industry, comprising the phases of:

subjecting a continuous stream of wet refuse, ground and freed of metal parts, to heating to a pasteurization/sterilization temperature for the time needed for complete cooking (where "cooking means treating by exposure to heat, and "complete cooking" means exposing to heat all the wet refuse for the time needed to reach pasteurization/sterilization temperature)., to give a continuous pasty and wet stream of cooked and concentrated refuse, and subjecting the said continuous pasty and wet stream to drying, to give a product having a moisture content of not more than 15%.

Advantageously, according to a preferred but not exclusive aspect of this invention, granulation of the pasty and wet stream of cooked refuse is carried out simultaneously with the abovementioned drying phase, to give granules having a relative moisture content variable between 15% and 5%.

For continuous industrial production and in order to guarantee complete pasteurization/sterilization and cooking of the wet refuse, the heating of the said wet refuse is carried out, according to another feature of this invention, by arranging them in the state of a thin layer.

It is advantageous and preferred to cause the thin layer to flow forward in substantial contact with a wall heated to a temperature at which the desired phases of pasteurization/sterilization and cooking can easily take place.

The best results from the point of view of uniformity of heating are obtained when the thin layer of wet refuse is maintained in constant and continuous mixing during the forward flow in contact with the heated wall, the mixing and forward flow advantageously being obtained mechanically.

In order to carry out this pasteurization/sterilization and cooking phase of the process of the present invention on an industrial scale, it is advantageous to use equipment known by the name turbo-cooker. This essentially comprises a tubular cylindrical body with a heated inner wall, a bladed rotor axially extending within the said tubular cylindrical body, the blades of which being arranged helically and having free ends which almost touch the heated wall. In the cylindrical body, one or more openings are provided for injecting the wet refuse stream, which is to be subjected to heat processing, and at least one opening is provided for discharging the pasty and wet continuous stream of cooked, pasteurized or sterilized refuse.

The phase of drying (and, if appropriate, granulation) of the wet and pasty stream of cooked refuse is advantageously also carried out while maintaining the said stream in the state of a thin turbulent layer and causing the latter to flow forward in contact with a heated wall.

Advantageously, equipment known by the name turbo-dryer/granulator is used for this phase of drying (and granulation). This equipment is structurally identical to the turbo-cooker schematically described above.

The material to be processed which enters this equipment is immediately centrifuged by the respective rotor against the heated wall, continuously forming an annular thin layer which is constantly maintained in agitation and mixing by the blades of the said rotor.

The helical arrangement of the blades and their orientation are selected in such a way that they push the thin annular layer of material toward the discharge from the equipment, with the residence times preset as a function of the operating phases which it is intended to carry out, and of the "nature" of the material to be processed.

While in operation, successive distinct portions of the said material are brought into contact with the heat source (heated wall) and then, almost immediately, are removed from the latter in a sequence of rapid thermal shocks and are reabsorbed in the mass of the said thin layer, with which they effect a heat exchange.

Using a turbo-cooker and a turbo-dryer/granulator of the abovementioned type, the process of this invention is characterized in that it comprises the phases of:

comminuting the wet refuse, previously freed of metal parts, to give a wet meal of refuse, feeding a continuous stream of said meal of refuse to a turbo-cooker having an inner wall heated to a temperature of 120–200° C., in which the bladed rotor is set into rotation at 200–600 rpm, for a residence time sufficient to cook and pasteurize/sterilize said meal of refuse, discharging from said turbo-cooker a continuous, substantially pasty and wet stream of cooked and pasteurized/sterilized refuse, at the same time separating therefrom any vapours and/or cases formed or released during the passage through the turbo-cooker, continuously feeding said wet and pasty stream to a turbo-dryer/granulator having an inner wall heated to a temperature of 200–300° C., in which the bladed rotor is set into rotation at 400–1200 rpm, and continuously discharging from said turbo-dryer a stream of dried/granulated product, and subsequently separating the latter from the vapour and the gases released during the passage through said turbo-dryer.

The product obtained constitutes an advantageous and effective supplement in animal nutrition.

Whenever the product fed in is not appropriately selected, the outgoing material can conveniently be used in agriculture.

Moreover, the obtained product represents a convenient alternative fuel, thanks to its high calorific power.

BRIEF DESCRIPTION OF THE DRAWING

The characteristics and advantages of the invention will be clarified further by the following description of some examples of embodiments of the process cited above, given with reference to the attached drawing which, for indicative and non-limiting purposes, shows apparatus/plant for such an embodiment.

DETAILED DESCRIPTION OF THE INVENTION

EXAMPLE 1

Wet food refuse, originating from canteens, communities and other similar catering establishments, collected in a storage silo/hopper 1, are passed by means of a conveyor 2 to a crushing/grinding station 3. During this transfer, the material is "freed" of any metal parts, located by a metal detector 4 which cooperates with a flow deflector 5 in order to direct the said metal parts to a receiving container 6.

The comminuted/ground wet refuse issuing from the station 3 is passed to a turbo-cooker 7.

The said turbo-cooker 7 is a machine which is known per se and will therefore not be described in detail. It essentially comprises a tubular cylindrical body 8, fitted with openings 9, 10 for the introduction of the material to be processed and for the discharge of the processed material. A heating jacket 11, through which, for example, a heat transfer oil flows, serves to maintain the inner wall 8a of the cylindrical body 8 at a preset temperature. In the said cylindrical body 8, an appropriately motorized, bladed rotor 12 is axially mounted, the blades of which are disposed according to a helical arrangement in order thus to push the material to be processed toward the discharge opening and to centrifuge it against the inner wall 8a so as to arrange it in a thin turbulent layer.

It should also be noted that the blades of the said rotor 12 can be oriented in various ways in order to vary the residence time of the material to be processed in the interior of the tubular cylindrical body 8.

For the purposes of implementing the process of this invention, among the machines of the above-mentioned type, the one designed by and commercially available from the company VOMM-IMPIANTI E PROCESSI-Milan, (Italy) has proved particularly useful and advantageous, in which machine the blades of the bladed rotor extend from the shaft of the said rotor until they almost touch the heated inner wall and are therefore active in all the space between the said shaft and the said wall.

The turbo-cooker 7 has an inner wall heated to a temperature of 160° C., while its bladed stirrer is set in rotation at a speed of 450 rpm.

While passing through the turbo-cooker, the ground wet refuse fed into the latter is disposed in the form of a thin annular turbulent layer which is moved in contact with the hot wall to undergo homogeneous uniform heating up to a temperature of about 125–130° C. (measured at the outlet from the turbo-cooker), which is a safe pasteurization/sterilization temperature. The residence time in the interior of the turbo-cooker is 7 minutes, which has been found to be more than sufficient for the pasteurization/sterilization of the material (or at any rate its concentration) as well as complete cooking thereof.

The pasty wet stream of cooked and pasteurized or sterilized refuse leaving the turbo-cooker 7 is collected in the tank/hopper 13 fitted with an extraction hood 14 for the vapours evolved during the cooking.

By means of the single-screw pump 15, a continuous stream of the said wet, cooked and pasteurized (concentrated) refuse is fed into the inlet of a turbo-dryer 16 which is structurally similar to the turbo-cooker 7. The inner wall of the said turbo-dryer 16 is heated to a temperature of 250° C., while its bladed rotor is set into rotation at a speed of 800 rpm.

A stream of heated air is fed into the said dryer 16 in cocurrent with the stream of material to be dried, to act as a fluid vector in order to remove, as quickly as possible, the water vapour which evolves continuously through the heat exchange of the material (wet and cooked refuse) with the hot wall of the turbo-dryer.

At the outlet of the said turbo-dryer 16, the air and vapour extracted from the latter as well as the dried (and granulated) product are passed continuously to a separator cyclone 17, from which the dried (and granulated) product with a relative moisture content of 15% is discharged through a rotary valve 18 and sent to a cooling unit 19.

The air/vapour mixture issuing from the top of cyclone 17, to which the stream of vapours extracted from the hood 14 is added, is fed into a scrubber unit 20 where scrubbing and precipitation of the pulverulent residues carried over by the said mixture take place.

In the next column 21, the condensation of the water vapour takes place, and the dehumidified air issuing from the said column is passed to a heating unit 22 and from there recycled to the turbo-dryer 16.

A diathermic oil boiler 23 furnishes the heat required for the cooking and pasteurization/sterilization phase, for the drying/granulation phase and also for heating the air.

The dried granulated product issuing from the cooler 19 is passed to storage silos from which it can be taken to a conventional finishing line.

This product, which has a balanced content of fibre, proteins, fats and sugars, can be validly used in fodder production, and, thanks to its good supply of C and N, can also be used in agriculture.

EXAMPLE 2

Wet food refuse originating from a confectionery/biscuit factory is subjected to a processing entirely similar to that described in Example 1, except for the use of different operating parameters due to the different composition, moisture content and toxicity of the material to be processed.

In fact, this ground and comminuted refuse was subjected to cooking in a turbo-cooker in which the wall temperature was controlled at values of 120–135° C., while the speed of the bladed rotor was controlled at values of 500–600 rpm.

The pasty stream which, leaving the turbo-cooker, had a safe pasteurization temperature of 100–110° C., was fed into a turbo-dryer/granulator whose wall temperature was 210° C. and in which the bladed rotor was run at 950 rpm.

The granules obtained could advantageously be used in fodder production even after a prolonged storage period.

EXAMPLE 3

Wet food refuse originating from sausage-makers and meat processing industries was subjected to a processing similar to that of Example 1, except that the turbo-cooker had a wall temperature controlled at values of 190–200° C. and the rotor was run at 250 rpm.

The pasty stream leaving the said turbo-cooker had a temperature of 130° C. and was fed at this temperature into a turbo-dryer/granulator whose wall temperature was controlled at values of 300° C., with the rotor run at 450 rpm.

The granules obtained could be used in fodder production even after prolonged storage periods.

The main advantages obtained are reported below.

With the process according to the invention, nearly 30% of urban refuse can be processed to an extent where it can then find a precisely defined application in the market.

The equipment is of reduced energy consumption; in fact, consumption of 800 Kcal/liter of water evaporated is assumed.

The simplicity of the plant and reduced dimensions as well as ease of management make the equipment suitable for meeting the requirements of any type of community.

The closed-circuit processing system eliminates any type of impact on the environment and the only effluent is represented by condensate waters which can be directly discharged into watercourses.

I claim:
1. A process for treating wet refuse of urban origin, where said wet refuse is free of metals and is ground, comprising the steps:
   a. flowing said wet refuse as a continuous stream and forming said continuous stream into a thin turbulent layer,
   b. heating said layer to a pasteurization/sterilization temperature for a time period sufficient to completely cook the wet refuse, thus producing a continuous wet stream of cooked and sanitized refuse, and
   c. drying said continuous wet stream of refuse to have a moisture content of not more than 15%.
2. A process according to claim 1, wherein heating said layer is done by causing said layer to flow in contact with a wall heated to said pasteurization/sterilization temperature.
3. A process according to claim 1, wherein said drying of said wet stream of refuse converts at least some of said wet refuse into granulated form.
4. A process according to claim 1, wherein said drying of said wet stream of refuse converts same into granulated form.
5. A process according to claim 2, wherein said wall in said heating step is heated to a temperature of 100–200° C., and said wall and said drying step is heated to a temperature of 200–400° C.
6. A process according to claim 1, wherein said heating step is conducted in a turbo-cooker having an inner wall which is heated to a temperature of 120–200° C. and a bladed rotor rotated at 200–600 rpm, and said drying step is conducted in a turbo-dryer having an inner wall which is heated to a temperature of 200–400° C. and a bladed rotor rotated at 400–1200 rpm.
7. A process according to claim 5, wherein said stream is caused to flow by a first bladed rotor rotated at 200–600 rpm in said heating step and by a second bladed rotor rotated at 400–1200 rpm in said drying step.
8. A process according to claim 5, wherein the product discharged from said drying step comprises dried refuse and vapor and gases released therefrom, comprising the further step of separating said dried refuse from said vapor and gases.
9. A process according to claim 7, wherein the product discharged from said drying step comprises dried refuse and vapor and gases released therefrom, comprising the further step of separating the stream of dried refuse from said vapor and gases.
10. A process according to claim 1, wherein said drying step comprises flowing said wet stream of cooked refuse through a turbo-dryer and comprises the further step of feeding a stream of hot air into said turbo-dryer concurrently with the flow of said wet stream of cooked and sanitized wet refuse.
11. A process according to claim 5, wherein comprises the further step of feeding a stream of hot air into said turbo-dryer concurrently with the flow of said wet stream of cooked and sterilized wet refuse therein.
12. A process for treating wet refuse of urban origin, and originating from the food industry and the agrifoods industry, comprising the steps:
   a. flowing said wet refuse as a continuous stream and forming said continuous stream into a thin turbulent layer,
   b. heating said layer to a pasteurization/sterilization temperature for a time period sufficient to completely cook the wet refuse, thus producing a continuous wet stream of cooked and sanitized refuse, and
   c. drying said continuous wet stream of refuse to have a moisture content of not more than 15%.

* * * * *

Disclaimer 5,906,793—Corrado Vezzani, Milan, Italy. PROCESS FOR THE DISPOSAL OF WET REFUSE. Patent dated May 25, 1999. Disclaimer filed May 16, 2001, by the assignee, Vomm Chemiphara S.r.l.

The term of this patent shall not extend beyond the expiration date of Pat. No. 5,653,122.

*(Official Gazette, July 31, 2001)*